(12) United States Patent
Weisman

(10) Patent No.: US 12,252,441 B2
(45) Date of Patent: Mar. 18, 2025

(54) CEMENTITIOUS COMPOSITIONS COMPRISING RECYCLED SUPERABSORBENT POLYMER

(71) Applicant: The Procter & Gamble Company, Cincinnati, OH (US)

(72) Inventor: Paul T. Weisman, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 684 days.

(21) Appl. No.: 17/511,676

(22) Filed: Oct. 27, 2021

(65) Prior Publication Data

US 2022/0127194 A1   Apr. 28, 2022

Related U.S. Application Data

(60) Provisional application No. 63/106,500, filed on Oct. 28, 2020, provisional application No. 63/106,523, filed on Oct. 28, 2020.

(51) Int. Cl.
*C04B 18/20* (2006.01)
*C04B 28/02* (2006.01)
*C04B 103/00* (2006.01)

(52) U.S. Cl.
CPC .............. *C04B 18/20* (2013.01); *C04B 28/02* (2013.01); *C04B 2103/0051* (2013.01)

(58) Field of Classification Search
CPC .. C04B 18/20; C04B 28/02; C04B 2103/0051
(Continued)

(56) References Cited

U.S. PATENT DOCUMENTS 6,837,496 B2   1/2005   Larson et al.
6,867,254 B2   3/2005   Wiercinski et al.
(Continued)

FOREIGN PATENT DOCUMENTS

WO   WO-2004101952 A1 *  11/2004   .............. C04B 14/08
WO   WO-2017039615 A1 *   3/2017   ........... B09B 3/0016

OTHER PUBLICATIONS

Karimi et al. "Recycled superabsorbent materials as an innovative concrete additive", The 9th International Symposium on Cement and Concrete (ISCC 2017), Oct. 31-Nov. 1, 2017, WHAN, China, ISCC CN, Nov. 1, 2017, pp. 1-6. (Year: 2017).*
(Continued)

*Primary Examiner* — Michael M. Bernshteyn
(74) *Attorney, Agent, or Firm* — Anna E. Haller; Christian M. Best

(57) ABSTRACT

A cementitious composition including recycled superabsorbent polymer (RSAP) and a cementitious material. The RSAP has a purity level of at least 85 percent by weight of the RSAP. Also provided is a cementitious composition where the RSAP has substantially low levels of one or more residual drug entities. Also provided is a method for the construction of a self-sealing cement sheath, the method comprising: supplying a self-sealing slurry of a cementitious composition including cementitious material, an aqueous fluid, and RSAP into an underground geological formation, and allowing the self-sealing slurry of the cementitious composition to cure, thereby forming the self-sealing cement sheath. The RSAP is capable of swelling in the presence of fluid to seal any cracks formed in the self-sealing slurry during curing.

20 Claims, 8 Drawing Sheets

(58) Field of Classification Search
USPC .................................................. 521/40.5
See application file for complete search history.

(56) References Cited

U.S. PATENT DOCUMENTS

| | | | |
|---|---|---|---|
| 6,889,768 B2 | 5/2005 | Girgenti |
| 7,491,755 B2 | 2/2009 | Bayer et al. |
| 7,607,482 B2 | 10/2009 | Roddy et al. |
| 7,726,400 B2 | 6/2010 | Zusatz et al. |
| 7,934,554 B2 | 5/2011 | Roddy |
| 8,245,784 B2 | 8/2012 | Tarafdar et al. |
| 8,267,175 B2 | 9/2012 | Weaver et al. |
| 8,485,255 B2 | 7/2013 | Tarafdar et al. |
| 8,641,818 B2 | 2/2014 | Roddy |
| 8,784,558 B2 | 7/2014 | Berke et al. |
| 8,795,834 B2 | 8/2014 | Tetrault et al. |
| 8,877,831 B2 | 11/2014 | Roddy et al. |
| 9,040,609 B2 | 5/2015 | Langlotz et al. |
| 9,193,627 B2 | 11/2015 | Dantin et al. |
| 9,206,344 B2 | 12/2015 | Roddy et al. |
| 9,216,925 B2 | 12/2015 | Ferrari et al. |
| 9,303,128 B2 | 4/2016 | Auer et al. |
| 9,353,006 B2 | 5/2016 | Lura et al. |
| 9,353,007 B2 | 5/2016 | Eberwein et al. |
| 9,353,009 B2 | 5/2016 | Dantin et al. |
| 9,359,253 B2 | 6/2016 | Hendrickson |
| 9,382,159 B2 | 7/2016 | Khalfallah et al. |
| 9,580,637 B2 | 2/2017 | Gordon et al. |
| 9,758,658 B2 | 9/2017 | Kim et al. |
| 9,822,295 B2 | 11/2017 | Reddy et al. |
| 9,884,785 B2 | 2/2018 | Liguori |
| 9,914,828 B2 | 3/2018 | Delheur et al. |
| 10,081,573 B2 | 9/2018 | Erk |
| 2003/0144386 A1 | 7/2003 | Pakusch et al. |
| 2003/0234103 A1 | 12/2003 | Lee et al. |
| 2005/0013981 A1 | 1/2005 | Schmidt et al. |
| 2005/0241538 A1 | 11/2005 | Vargo et al. |
| 2007/0100028 A1 | 5/2007 | Mang |
| 2007/0127988 A1 | 6/2007 | Nakakuma |
| 2007/0204765 A1* | 9/2007 | Le Roy-Delage | C09K 8/467 |
| | | | 106/808 |
| 2008/0205830 A1 | 8/2008 | Cook |
| 2010/0285224 A1 | 11/2010 | Fisher |
| 2011/0095227 A1 | 4/2011 | Herth et al. |
| 2011/0120715 A1* | 5/2011 | Le Roy-Delage | |
| | | | C04B 40/0675 |
| | | | 166/292 |
| 2011/0160096 A1 | 6/2011 | Roddy |
| 2014/0262228 A1 | 9/2014 | Deville et al. |
| 2015/0148456 A1 | 5/2015 | Eissmann et al. |
| 2015/0203401 A1 | 7/2015 | Kriegstein |
| 2016/0326054 A1* | 11/2016 | Erk | C04B 24/2652 |
| 2017/0217135 A1 | 8/2017 | Fischer et al. |
| 2017/0320775 A1 | 11/2017 | Kurz et al. |
| 2017/0334777 A1 | 11/2017 | Koster et al. |
| 2017/0349805 A1 | 12/2017 | Musso et al. |
| 2018/0142414 A1 | 5/2018 | Sealey et al. |
| 2018/0171207 A1 | 6/2018 | Fischer et al. |
| 2018/0171208 A1 | 6/2018 | Fischer et al. |
| 2018/0208509 A1 | 7/2018 | Terrasi et al. |
| 2018/0230053 A1 | 8/2018 | Chiaverini et al. |
| 2018/0236692 A1* | 8/2018 | Lee | B09B 3/80 |
| 2018/0237674 A1 | 8/2018 | Pflieger |
| 2019/0092687 A1* | 3/2019 | Erk | C04B 40/0633 |

OTHER PUBLICATIONS

PCT Search Report and Written Opinion for PCT/US2021/056414 dated Feb. 9, 2022, 13 pages.

He Ziming et al: "Cement-based materials modified with superabsorbent polymers: A review", Construction and Building Materials, vol. 225, Jul. 25, 2019, pp. 569-590.

Karimi H et al., "Recycled superabsorbent materials as an innovative concrete additive", The 9th International Symposium on Cement and Concrete (ISCC 2017), Oct. 31-Nov. 3, 2017, 6 pages.

Karimi H et al: "Valorization of waste baby diapers in concrete", Resources, Conservation and Recycling, vol. 153, Nov. 14, 2019, 10 pages.

* cited by examiner

CEMENTITIOUS COMPOSITIONS COMPRISING RECYCLED SUPERABSORBENT POLYMER

CROSS REFERENCE TO RELATED APPLICATION

This application claims the benefit of U.S. Provisional Patent Application No. 63/106,523 and U.S. Provisional Patent Application No. 63/106,500, both filed on Oct. 28, 2020, the entire disclosures of each of which is fully incorporated herein by reference.

FIELD

The present disclosure is directed to cementitious compositions comprising recycled superabsorbent polymer (RSAP), and more particularly cementitious compositions comprising RSAP that is recovered from used absorbent articles.

BACKGROUND

Absorbent articles typically comprise a topsheet, a backsheet, and an absorbent core disposed between the topsheet and the backsheet. The absorbent article may also comprise an acquisition layer that temporarily stores liquid bodily exudates received from the topsheet before being received by the absorbent core. The absorbent core typically comprises superabsorbent polymer (SAP) particles that absorb and store the liquid bodily exudates.

Absorbent articles typically comprise a wide variety of different materials, including plastic films, foam, SAP particles, natural materials such as cellulose fiber, etc., many of which may be bonded or joined together. Due to the presence of bodily exudates and the cost and difficulty associated with separating the component materials and rendering them suitable for reuse, used absorbent articles have typically been excluded from the stream of waste products for differential collection and recycling. As a result, most used absorbent articles are currently disposed of as regular, undifferentiated waste.

The proliferation of regulations limiting landfill waste, along with rising costs, have made traditional disposal of waste in landfills less desirable. In addition, global demand for absorbent articles may potentially rise due to increasing birth rates in developing countries, rising household incomes, and a growing aging population. The growing demand for absorbent articles will further exacerbate the number of absorbent articles going to landfill. Communities around the globe are seeking solutions to the growing waste stream of used absorbent articles. Furthermore, there is global interest in creating a circular economy in various parts of the world by instituting materials recycling programs for metals, plastics, packaging materials, and other materials and/or products, including absorbent articles. However, many obstacles remain to achieving meaningful levels of recycling for used absorbent articles. For example, in order for recycling to be technologically and economically feasible, each different material of the absorbent article requires a suitable recycling process or material-specific separation means within the overall recycling process and, most importantly, an appropriate end use and/or market for the separated recycled material.

Following use, absorbent articles may undergo a recycling process wherein components are separated to individual streams of materials potentially ready for reuse. Separated diaper components include plastic, cellulose and/or other natural fibers or materials, and SAP. Operators of such recycling operations need to identify outlets or demand for their recycling streams, most importantly recycled superabsorbent polymer (RSAP) as this material is a key component of absorbent articles. Without an outlet for the recycled materials, importantly the RSAP, the entire recycling operation may not be economically viable and may face eventual shutdown.

Given the widespread interest and need to recycle used absorbent articles, there is a need to find economically feasible outlets for RSAP. Furthermore, consumers may feel more confident in purchasing absorbent articles with the knowledge that their used absorbent articles can be recycled and that the recycled materials from the absorbent article, including RSAP, can be used in a manner that is environmentally friendly and contributes to the betterment of society and the growth of global economies. Net, there is a need for economically viable end use options for RSAP recovered from used absorbent articles.

SUMMARY

The present disclosure provides a cementitious composition comprising a recycled superabsorbent polymer (RSAP) and a cementitious material. Use of RSAP in the cementitious composition repurposes the RSAP into a highly functional additive or internal curing agent for increasing the strength of the cementitious composition or raising the performance of the cementitious composition, e.g., to levels associated with high performance concrete. It is believed that the use of RSAP in cementitious compositions as described herein represents a new combination of a RSAP and cementitious material, in which the previously discarded superabsorbent polymer in a used diaper has been recovered and incorporated into a commercially viable product stream to be used in, for example, the concrete business.

In particular, the disclosure comprises a RSAP exhibiting specific performance parameters and characteristics, incorporated into a cementitious composition, in which a reduced ratio of water to cementitious material ratio in the final installed composition may be achieved. There may be associated increases in concrete performance and other benefits of the concrete.

In accordance with an aspect of the present disclosure, a cementitious composition is provided comprising RSAP, and a cementitious material, in which the RSAP exhibits a purity level of at least 85 percent by weight of the RSAP. The purity level of the RSAP is measured prior to mixing or combining with the cementitious material or other cementitious composition components.

The purity level of the RSAP may be between about 85 percent and 100 percent, about 85 percent and about 99 percent, about 87 percent and about 98 percent, or about 90 percent and about 95 percent.

The RSAP may be present in a range of from about 0.025 to about 0.5 percent by weight of the cementitious material. Alternatively, the RSAP is present in a range of from about 0.05 to about 0.4 percent, or about 0.07 to about 0.2 percent, by weight of cementitious material.

The cementitious composition may comprise a ratio of water to the cementitious material ratio of between about 0.2 to about 0.5, about 0.25 to about 0.4, or about 0.26 to about 0.35, by weight of the cementitious composition.

The RSAP may be present in a range of from about 3.5 ounces to about 40 ounces per cubic yard of the cementitious composition, about 10 ounces to about 37 ounces per cubic yard of the cementitious composition, or about 17 ounces to about 35 ounces per cubic yard of the cementitious composition.

The RSAP may comprise at least about 25 percent acrylic acid monomer units by weight of the RSAP. Alternatively, the RSAP may comprise between about 25 percent to about 50 percent, about 40 percent to about 75 percent, about 50 percent to about 90 percent, or about 75 percent to about 100 percent acrylic acid monomer units by weight of the RSAP.

The RSAP may comprise at least about 25 percent neutralized acrylic acid monomer units by weight of the RSAP. Alternatively, the RSAP may comprise between about 25 percent to about 50 percent, about 40 percent to about 75 percent, about 50 percent to about 90 percent, or about 75 percent to about 100 percent neutralized acrylic acid monomer units by weight of the RSAP. The percent neutralized acrylic acid monomer units are the percent of acrylic acid monomer units that have been neutralized by any base material.

In some examples, the RSAP may comprise one or more crosslinking monomers. In other examples, the RSAP may comprise one or more residual drug entities. In further examples, the RSAP may comprise substantially low levels of one or more residual drug entities.

The RSAP may comprise particles exhibiting a median particle size of from about 1 μm to about 1600 μm, as measured according to the Median Particle Size Test Method described herein. Alternatively, the RSAP may comprise particles exhibiting a median particle size of from about 30 μm to about 1000 μm, about 40 μm to about 900 μm, or about 200 μm to about 700 μm, as measured according to the Median Particle Size Test Method described herein.

The RSAP may comprise particles exhibiting a Centrifuge Retention Capacity (CRC) of from about 10 g/g to about 50 g/g, as measured according to the Centrifuge Retention Capacity Test Method described herein. Alternatively, the RSAP comprises particles exhibiting a CRC of from about 20 g/g to about 40 g/g, as measured according to the Centrifuge Retention Capacity Test Method described herein.

The RSAP may comprise particles comprising surface crosslinking.

The cementitious composition of the present disclosure comprises RSAP, in which the RSAP may comprise two or more of the following: a purity level of at least 85 percent; present in a range of about 0.025 percent to about 0.5 percent by weight of the cementitious material; at least about 25 percent acrylic acid monomer units; at least about 25 percent neutralized acrylic acid monomer units; one or more crosslinking monomers; one or more residual drug entities; substantially low levels of one or more residual drug entities; a median particle size of from about 1 μm to about 1600 μm, as measured according to the Median Particle Size Test Method described herein; a CRC of from about 10 g/g to about 50 g/g, as measured according to the Centrifuge Retention Capacity Test Method described herein; or particles comprising surface crosslinking.

In accordance with another aspect of the present disclosure, a method for the construction of a self-sealing cement sheath is provided, the method comprising: supplying a self-sealing slurry of a cementitious composition into an underground geological formation, in which the cementitious composition comprises a cementitious material, an aqueous fluid, and RSAP in accordance with the present disclosure; and allowing the self-sealing slurry of the cementitious composition to cure, thereby forming the self-sealing cement sheath, in which the RSAP is capable of swelling in the presence of fluid to seal any cracks formed in the self-sealing slurry during curing.

DETAILED DESCRIPTION

Definition of Terms

Figure 1:
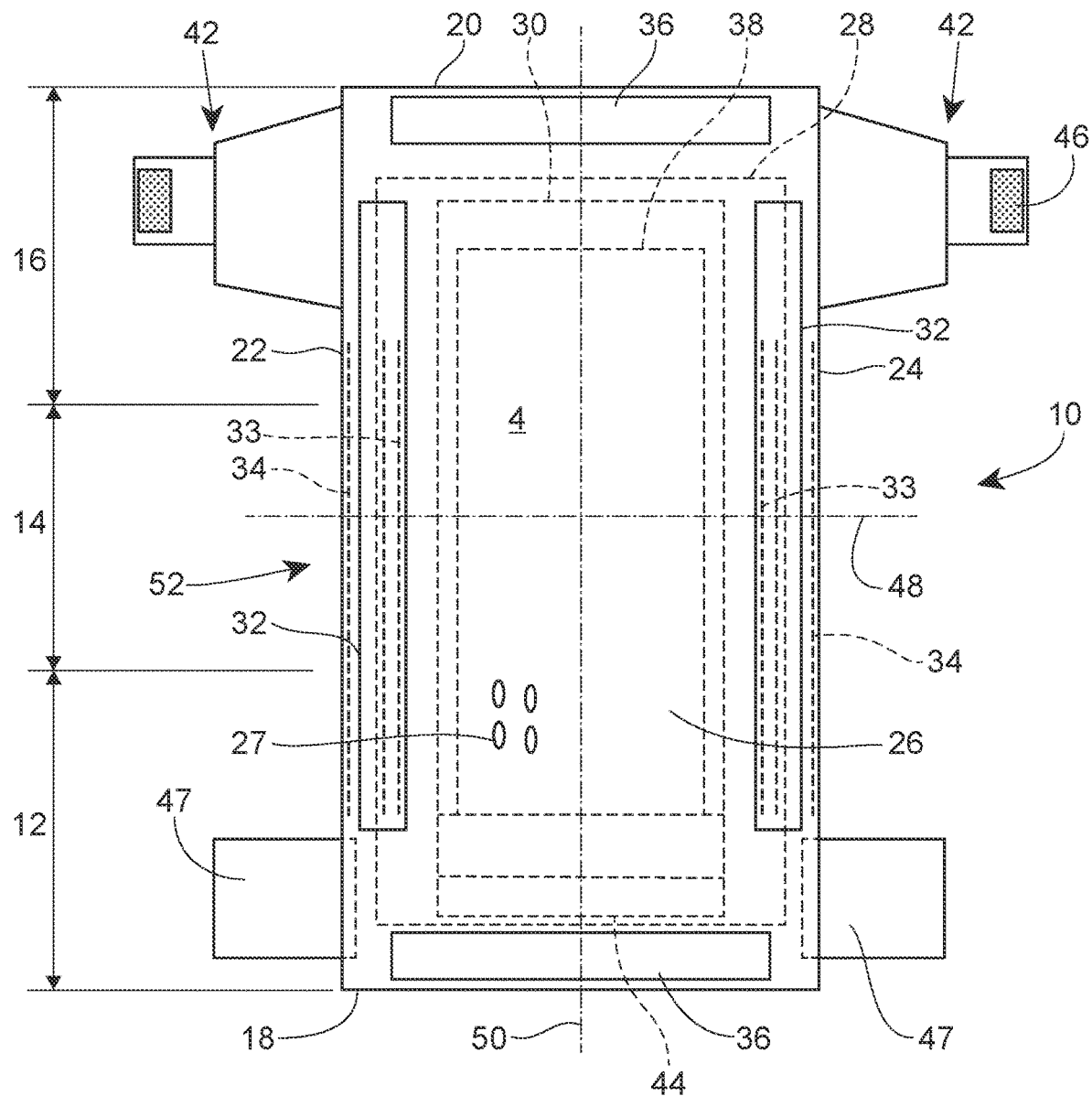
FIG. 1 is a plan view of the example absorbent article, wearer-facing surface facing the viewer, in a flat laid-out state.

The term "absorbent article" may include disposable articles such as sanitary napkins, panty liners, tampons, interlabial devices, wound dressings, pants, taped diapers, adult incontinence articles, and the like. At least some of such absorbent articles are intended for the absorption of body liquids, such as menses or blood, vaginal discharges, urine, and feces.

The term "disposable" may be used herein to describe absorbent articles and other products which are not intended to be laundered or otherwise restored or reused as an absorbent article or product (i.e., they are intended to be discarded after use and, preferably, to be recycled, composted or otherwise disposed of in an environmentally compatible manner).

Absorbent articles of the present invention may be "devoid of" or "free of" particular undesirable materials, ingredients, or characteristics in some forms. "Devoid of," "free of," and the like, as those terms are used herein, may mean that the absorbent article does not have more than trace amounts of background levels of the material, ingredient, or characteristic following these qualifiers; the amount of the material or ingredient does not cause harm or irritation that consumers typically associate with the material or ingredient; or the material or ingredient is not added to the absorbent article intentionally. In some instances, "devoid of" and "free of" can mean there is no measurable amount of the material or ingredient. For example, the absorbent article in some forms contain no measurable amounts of chlorine—that is, the article is characterized as being totally chlorine free.

"Particle" as used herein means a solid additive, such as a powder, granule, encapsulate, microcapsule, and/or prill. In one example, the particle may exhibit a median particle size of 1600 μm or less, as measured according to a Median Particle Size Test Method described herein. In another example, the particle may exhibit a median particle size of from about 1 µm to about 1600 µm and/or from about 1 µm to about 800 µm and/or from about 5 µm to about 500 µm and/or from about 10 µm to about 300 µm and/or from about 10 µm to about 100 µm and/or from about 10 µm to about 50 µm and/or from about 10 µm to about 30 µm, as measured according to the Median Particle Size Test Method described herein. The shape of the particles may be in the form of spheres, rods, plates, tubes, squares, rectangles, discs, stars, and/or fibers, and the particles may have a regular form or irregular, random forms.

The term "recyclable" may be used herein to refer to a material (e.g., plastic, paper, etc.) that has the ability to enter into established recycling streams or be used in a recycling stream avoiding the normal fate of a disposable absorbent product, namely deposition in a landfill.

The term "recycled" as used herein may refer to material such as superabsorbent polymer (SAP) that is recovered, extracted, or collected from used, post-consumer use, community collected post-consumer use, or soiled absorbent articles. The components of absorbent articles may be cleaned, sanitized, and separated using one or more suitable processes, such as those described in, for example, U.S. Pat. Nos. 8,883,076; 8,979,005; 9,095,853; and 9,156,034, and U.S. Patent Application Publication Nos. 2020/0001506 and 2020/0016794. Following recovery from the used absorbent article, the recycled material may undergo one or more optional treatments or processing steps.

General Description of an Absorbent Article

Figure 2:
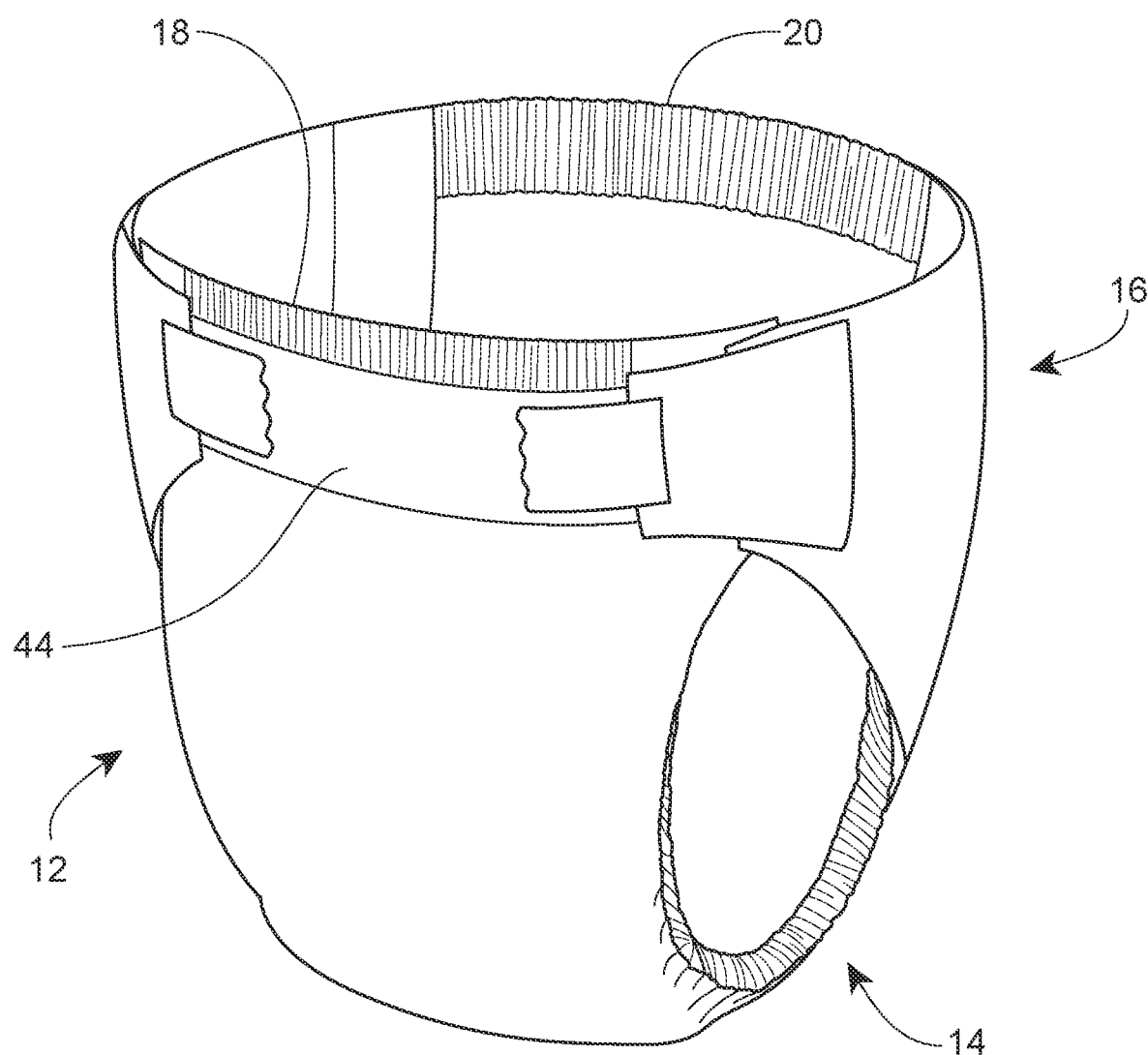
FIG. 2 is a front perspective view of the absorbent article of FIG. 1 in a fastened position.

An example absorbent article 10 according to the present disclosure, shown in the form of a taped diaper, is represented in FIGS. 1 and 2. FIG. 1 is a plan view of the example absorbent article 10, wearer-facing surface 4 facing the viewer in a flat, laid-out state. FIG. 2 is a front perspective view of the absorbent article 10 of FIG. 1 in a fastened configuration. The absorbent article 10 of FIGS. 1 and 2 is shown for illustration purposes only as the present disclosure may be used for making a wide variety of diapers, including adult incontinence products, pants, or other absorbent articles, such as sanitary napkins and absorbent pads, for example.

The absorbent article 10 may comprise a front waist region 12, a crotch region 14, and a back waist region 16. The crotch region 14 may extend intermediate the front waist region 12 and the back waist region 16. The front waist region 12, the crotch region 14, and the back waist region 16 may each be ⅓ of the length of the absorbent article 10. The absorbent article 10 may comprise a front end edge 18, a back end edge 20 opposite to the front end edge 18, and longitudinally extending, transversely opposed side edges 22 and 24 defined by the chassis 52.

The absorbent article 10 may comprise a liquid permeable topsheet 26, a liquid impermeable backsheet 28, and an absorbent core 30 positioned at least partially intermediate the topsheet 26 and the backsheet 28. The absorbent article 10 may also comprise one or more pairs of barrier leg cuffs 32 with or without elastics 33, one or more pairs of leg elastics 34, one or more elastic waistbands 36, and/or one or more acquisition materials 38. The acquisition material or materials 38 may be positioned intermediate the topsheet 26 and the absorbent core 30. An outer cover material 40, such as a nonwoven material, may cover a garment-facing side of the backsheet 28. The absorbent article 10 may comprise back ears 42 in the back waist region 16. The back ears 42 may comprise fasteners 46 and may extend from the back waist region 16 of the absorbent article 10 and attach (using the fasteners 46) to the landing zone area or landing zone material 44 on a garment-facing portion of the front waist region 12 of the absorbent article 10. The absorbent article 10 may also have front ears 47 in the front waist region 12. The absorbent article 10 may have a central lateral (or transverse) axis 48 and a central longitudinal axis 50. The central lateral axis 48 extends perpendicular to the central longitudinal axis 50.

Topsheet

The topsheet 26 is the part of the absorbent article 10 that is in contact with the wearer's skin. The topsheet 26 may be joined to portions of the backsheet 28, the absorbent core 30, the barrier leg cuffs 32, and/or any other layers as is known to those of ordinary skill in the art. The topsheet 26 may be compliant, soft-feeling, and non-irritating to the wearer's skin. Further, at least a portion of, or all of, the topsheet may be liquid permeable, permitting liquid bodily exudates to readily penetrate through its thickness. A suitable topsheet may be manufactured from a wide range of materials, such as porous foams, reticulated foams, apertured plastic films, woven materials, nonwoven materials, woven or nonwoven materials of natural fibers (e.g., wood or cotton fibers), synthetic fibers or filaments (e.g., polyester or polypropylene or bicomponent PE/PP fibers or mixtures thereof), or a combination of natural and synthetic fibers. The topsheet may have one or more layers. The topsheet may be apertured (FIG. 1, element 27), may have any suitable three-dimensional features, and/or may have a plurality of embossments (e.g., a bond pattern). The topsheet may be apertured by overbonding a material and then rupturing the overbonds through ring rolling, such as disclosed in U.S. Pat. No. 5,628,097, to Benson et al., issued on May 13, 1997 and disclosed in U.S. Pat. Appl. Publication No. US 2016/0136014 to Arora et al. Any portion of the topsheet may be coated with a skin care composition, an antibacterial agent, a surfactant, and/or other beneficial agents. The topsheet may be hydrophilic or hydrophobic or may have hydrophilic and/or hydrophobic portions or layers. If the topsheet is hydrophobic, typically apertures will be present so that bodily exudates may pass through the topsheet.

Backsheet

The backsheet 28 is generally that portion of the absorbent article 10 positioned proximate to the garment-facing surface of the absorbent core 30. The backsheet 28 may be joined to portions of the topsheet 26, the outer cover material 40, the absorbent core 30, and/or any other layers of the absorbent article by any attachment methods known to those of skill in the art. The backsheet 28 prevents, or at least inhibits, the bodily exudates absorbed and contained in the absorbent core 30 from soiling articles such as bedsheets, undergarments, and/or clothing. The backsheet is typically liquid impermeable, or at least substantially liquid impermeable. The backsheet may, for example, be or comprise a thin plastic film, such as a thermoplastic film having a thickness of about 0.012 mm to about 0.051 mm. Other suitable backsheet materials may include breathable materials which permit vapors to escape from the absorbent article, while still preventing, or at least inhibiting, bodily exudates from passing through the backsheet.

Absorbent Core

Figure 3:
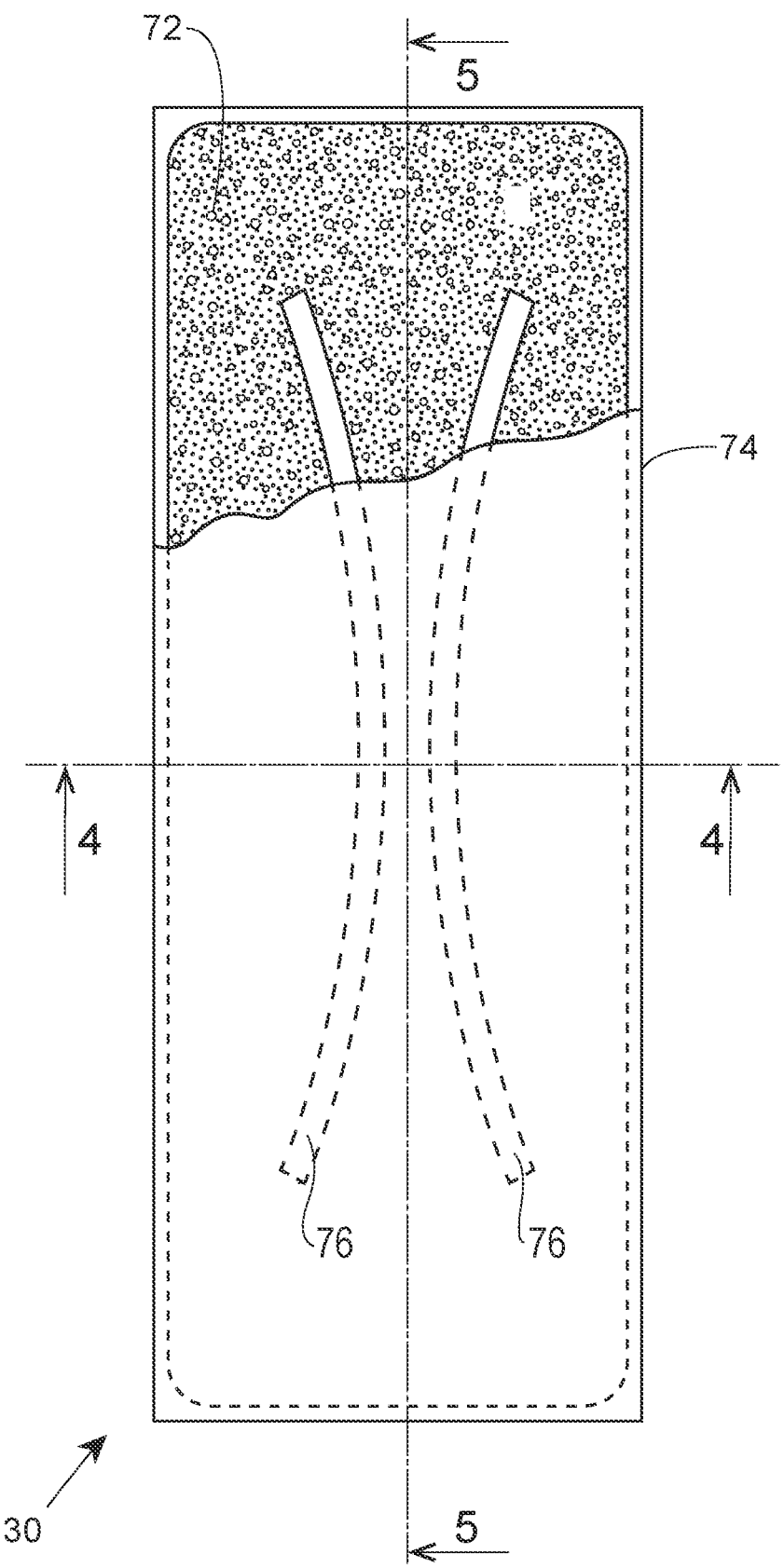
FIG. 3 is a plan view of an example absorbent core or an absorbent article.
Figure 4:
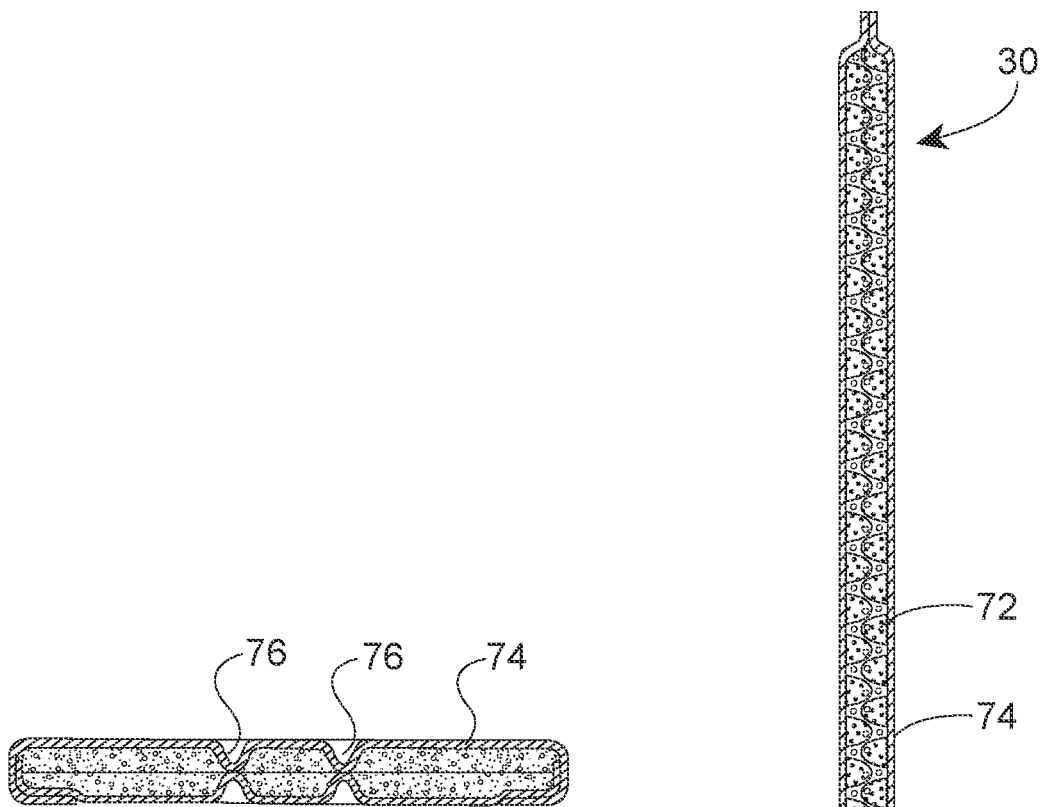
FIG. 4 is a cross-sectional view, taken about line 4-4 of the absorbent core of FIG. 3.
Figure 5:
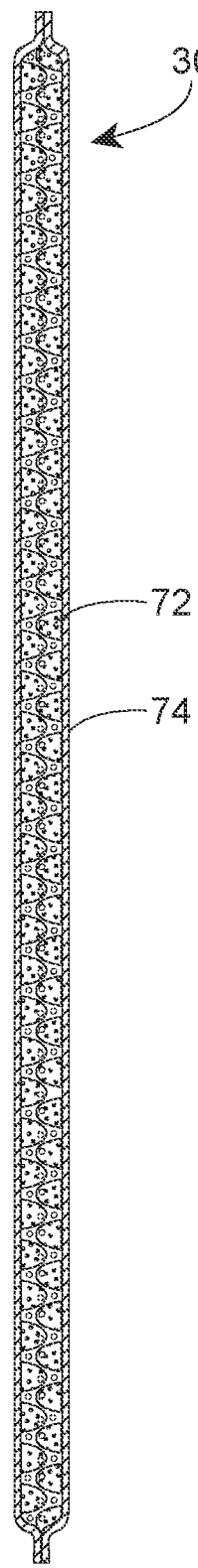
FIG. 5 is a cross-sectional view, taken about line 5-5 of the absorbent core of FIG. 3.

As used herein, the term "absorbent core" 30 refers to the component of the absorbent article 10 having the most absorbent capacity and that comprises an absorbent material. Referring to FIGS. 3-5, in some instances, absorbent material 72 may be positioned within a core bag or a core wrap 74. The absorbent material may be profiled or not profiled, depending on the specific absorbent article. The absorbent core 30 may comprise, consist essentially of, or consist of, a core wrap, absorbent material 72, and glue enclosed within the core wrap. The absorbent material may comprise superabsorbent polymers, a mixture of superabsorbent polymers and air felt, only air felt, and/or a high internal phase emulsion foam. In some instances, the absorbent material may comprise at least 80%, at least 85%, at least 90%, at least 95%, at least 99%, or up to 100% superabsorbent polymers, by weight of the absorbent material. In such instances, the absorbent material may free of air felt, or at least mostly free of air felt. The absorbent core periphery, which may be the periphery of the core wrap, may define any suitable shape, such as rectangular "T," "Y," "hour-glass," or "dog-bone" shaped, for example. An absorbent core periphery having a generally "dog bone" or "hour-glass" shape may taper along its width towards the crotch region 14 of the absorbent article 10.

Referring to FIGS. 3-5, the absorbent core 30 may have areas having little or no absorbent material 72, where a wearer-facing surface of the core bag 74 may be joined to a garment-facing surface of the core bag 74. These areas having little or no absorbent material may be referred to as "channels" 76. These channels can embody any suitable shapes and any suitable number of channels may be provided. In other instances, the absorbent core may be embossed to create the impression of channels. The absorbent core in FIGS. 3-5 is merely an example absorbent core. Many other absorbent cores with or without channels are also within the scope of the present disclosure.

Acquisition Materials

Referring to FIG. 1, one or more acquisition materials 38 may be present at least partially intermediate the topsheet 26 and the absorbent core 30. The acquisition materials 38 are typically hydrophilic materials that providing significant wicking of bodily exudates. These materials may dewater the topsheet 26 and quickly move bodily exudates into the absorbent core 30. The acquisition materials 38 may comprise one or more nonwoven materials, foams, cellulosic materials, cross-linked cellulosic materials, air laid cellulosic nonwoven materials, spunlace materials, or combinations thereof, for example. In some instances, portions of the acquisition materials 38 may extend through portions of the topsheet 26, portions of the topsheet 26 may extend through portions of the acquisition materials 38, and/or the topsheet 26 may be nested with the acquisition materials 38. Typically, an acquisition material 38 may have a width and length that are smaller than the width and length of the topsheet 26. The acquisition material may be a secondary topsheet in the feminine pad context. The acquisition material may have one or more channels as described above with reference to the absorbent core 30 (including the embossed version). The channels in the acquisition material may align or not align with channels in the absorbent core 30. In an example, a first acquisition material may comprise a nonwoven material and a second acquisition material may comprise a cross-linked cellulosic material.

Sanitary Napkin

Figure 6:
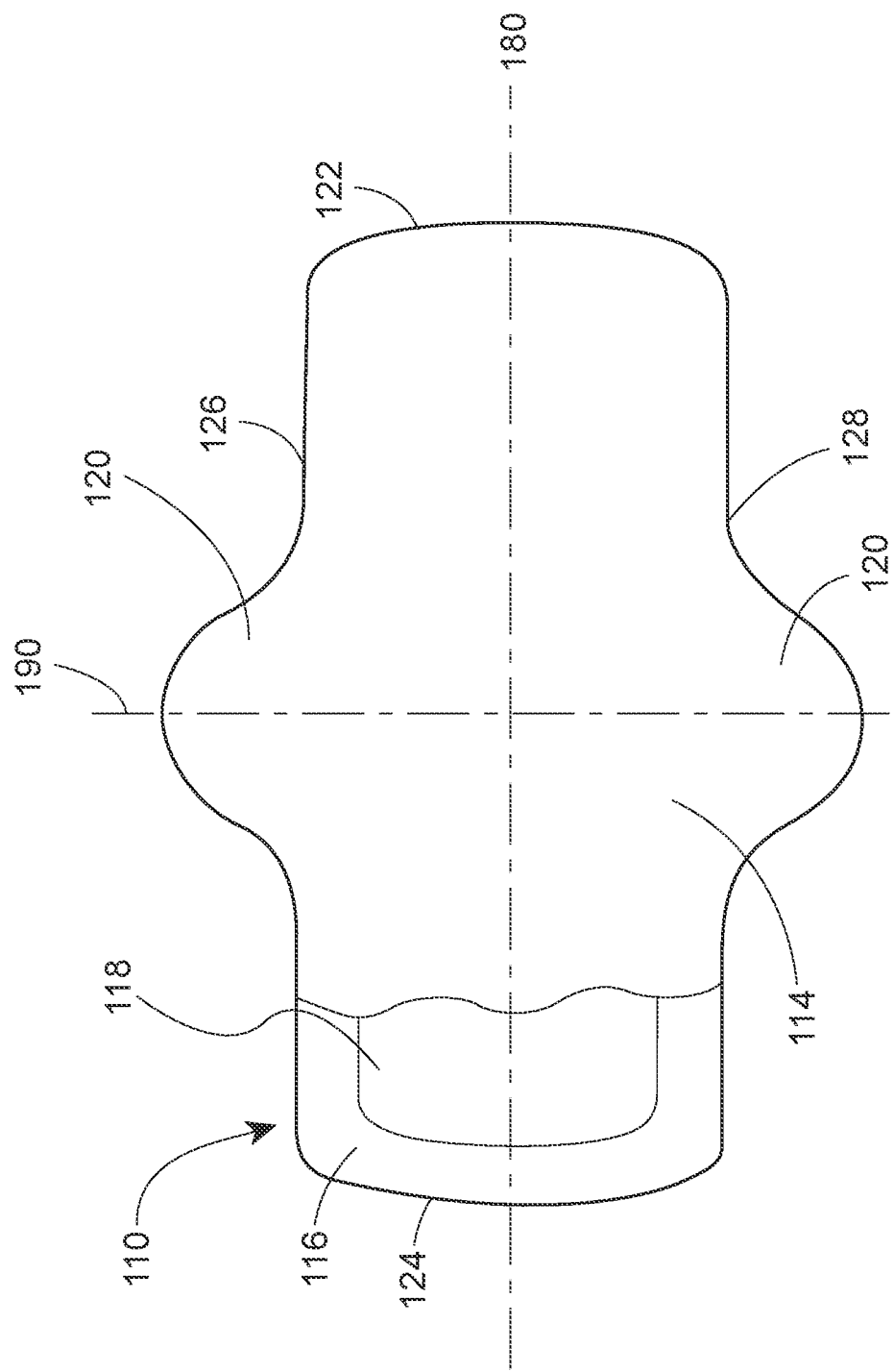
FIG. 6 is a plan view of an example absorbent article of the present disclosure that is a sanitary napkin.

Referring to FIG. 6, an absorbent article of the present disclosure may be a sanitary napkin 110. The sanitary napkin 110 may comprise a liquid permeable topsheet 114, a liquid impermeable, or substantially liquid impermeable, backsheet 116, and an absorbent core 118. The liquid impermeable backsheet 116 may or may not be vapor permeable. The sanitary napkin 110 may also comprise wings 120 extending outwardly with respect to a longitudinal axis 180 of the sanitary napkin 110. The sanitary napkin 110 may also comprise a lateral axis 190. The wings 120 may be joined to the topsheet 114, the backsheet 116, and/or the absorbent core 118. The sanitary napkin 110 may also comprise a front edge 122, a back edge 124 longitudinally opposing the front edge 122, a first side edge 126, and a second side edge 128 longitudinally opposing the first side edge 126. The longitudinal axis 180 may extend from a midpoint of the front edge 122 to a midpoint of the back edge 124. The lateral axis 190 may extend from a midpoint of the first side edge 128 to a midpoint of the second side edge 128. The sanitary napkin 110 may also be provided with additional features commonly found in sanitary napkins as is known.

Recycling of Absorbent Articles Comprising Recyclable Materials

Following use, absorbent articles comprising one or more recyclable materials according to the present disclosure may be prepared for recycling using one or more known methods. Exemplary methods for treatment of absorbent articles for recycling are described in, for example, U.S. Pat. Nos. 8,883,076; 8,979,005; 9,095,853; and 9,156,034, and U.S. Patent Application Publication Nos. 2020/0001506 and 2020/0016794. These exemplary methods may be used, for example, to open folded absorbent articles and to dry, sterilize, and at least partially destructure the absorbent articles. The destructured absorbent article pieces then undergo separation processes where they may be separated into individual raw material streams such as recycled plastic, recycled wood pulp, and/or Recycled Superabsorbent Polymer (RSAP).

While not intending to be bound by theory, it is believed that RSAP in accordance with the present disclosure may deliver high performance concrete properties and quality in spite of the starting polymer material having potentially been subject to unknown, unpredictable, and/or widely varying usage, handling, and/or treatment(s), including the original polymer material being used in the manufacture of an absorbent article, used by a consumer of the absorbent article, collected for recycling, stored in a used state while awaiting recycling, and/or undergoing the final step of chemical and mechanical transformations of an absorbent article recycling operation to ultimately yield the inventive RSAP.

Recycled Superabsorbent Polymer (RSAP)

RSAP in accordance with the present disclosure may comprise SAP particles formed from one or more monomers and/or oligomers of acrylic acids, salts, acrylates, or derivatives thereof. For example, the monomers and/or oligomers may include ethylenically unsaturated carboxylic acids or their salts, such as acrylic acid, methacrylic acid, maleic acid, fumaric acid, tricarboxy ethylene, itaconic acid, ethylenically unsaturated phosphonic acid or their salts, ethylenically unsaturated sulfonic acid or their salts, or derivatives thereof, such as acrylamide with 2-acrylamido-2-methylpropane sulfonic acid, methacrylamide, acrylic esters, and methacrylic esters.

The monomers and/or oligomers may preferably be selected from the group comprised of ethylenically unsaturated carboxylic acids such as methacrylic acid or its salts, or acrylic acid or its salts, ethylenically unsaturated phosphonic acids or their salts, ethylenically unsaturated sulfonic acids or their salts, or mixtures thereof, with acrylic acid or its salts and methacrylic acid or its salts being particularly preferred monomers and/or oligomers. The RSAP may comprise at least about 25% acrylic acid monomer units by weight of the RSAP. Preferably, the RSAP may comprise about 25% to about 50%, more preferably about 40% to about 75%, even more preferably about 50% to about 90%, and most preferably about 75% to about 100% acrylic acid monomer units by weight of the RSAP. The preparation of useful monomers and/or oligomers is described in DE 19941423 A1, EP 0686650 A1, WO 2001/045758 A1, and WO 2003/014300 A2.

The RSAP may additionally comprise use of one or more neutralizing agents. Such neutralizing agents may be alkali metal hydroxides, alkali metal oxides, alkali metal carbonates or alkali metal bicarbonates and also mixtures thereof. Furthermore, neutralizing agents may be ammonia, or amine derivatives, such as ethanolamine, diethanolamine, triethanolamine or dimethylaminoethanolamine. For alkali metal salts, sodium and potassium may be utilized. Neutralizing agents may preferably be sodium hydroxide, sodium carbonate or sodium bicarbonate and mixtures thereof. Neutralization is typically achieved via admixing the neutralizing agent as an aqueous solution or as an aqueous dispersion or else as a molten or as a solid material. The acid groups of the monomers and/or oligomers are typically 0-100 mol %, preferably 25-100 mol %, more preferably 65-90 mol %, and most preferably 68-80 mol % neutralized. The RSAP may comprise about 25% to about 50%, preferably between about 40% to about 75%, more preferably between about 50% to about 90%, or even more preferably between about 75% to about 100% neutralized acrylic acid monomer units by weight of the RSAP.

The RSAP may further comprise use of one or more crosslinkers. For example, crosslinkers may include ethylene glycol dimethacrylate, diethylene glycol diacrylate, allyl methacrylate, trimethylolpropane triacrylate, triallylamine, tetraallyloxyethane as described in EP 0530438 A1, di- and triacrylates as described in EP 0547847 A1, EP 0559476 A1, EP 0632068 A1, WO 1993/021237 A1, WO 2003/0104299 A1, WO 2003/104300 A1, WO 2003/104301 A1, and DE 10331450 A1, mixed acrylates which, as well as acrylate groups, contain further ethylenically unsaturated groups, as described in DE 10331456 A1 and DE 10355401 A1, or crosslinker mixtures as described for example in DE 19543368 A1, DE 19646484 A1, WO 1990/015830 A1, and WO 2002/032962 A2. The crosslinker may preferably comprise acrylate or acrylamide groups.

In one particular example, the RSAP may preferably include acrylate or acrylamide groups with monomers and/or oligomers, and the crosslinker may preferably be diacrylated, dimethacrylated, triacrylated or trimethacrylated multiply exthoxylated and/or propoxylated glycerols. Di- and/or triacrylates of 3- to 10-tuply ethoxylated glycerol are particularly advantageous. More preferably, the crosslinker may be di- or triacrylates of 1- to 5-tuply ethoxylated and/or propoxylated glycerol.

The RSAP particles may be surface crosslinked. In some examples, the surface crosslinker may comprise one or more thermally activated surface crosslinkers. The term "thermally activated surface crosslinkers" may refer to surface crosslinkers that react only upon exposure to increased temperatures, typically around 150° C. Known thermally activated surface crosslinkers are, e.g., di- or polyfunctional agents that are capable of building additional crosslinks between the polymer chains of the RSAP particles. Other thermally activated surface crosslinkers include, e.g., di- or polyhydric alcohols, or derivatives thereof, capable of forming di- or polyhydric alcohols. Representatives of such agents are alkylene carbonates, ketales, and di- or polyglycidylethers. Moreover, (poly)glycidyl ethers, haloepoxy compounds, polyaldehydes, polyoles and polyamines are also well known thermally activated surface crosslinkers. The crosslinking is based on a reaction between the functional groups comprised by the RSAP particle, for example, an esterification reaction between a carboxyl group (comprised by the polymer) and a hydroxyl group (comprised by the surface crosslinker).

Other substances, such as surfactants, may additionally be added together with the surface crosslinker. Surface crosslinking is typically conducted at temperatures of at least 100° C., or minimally 120° C., or minimally 150° C. It may be desirable to keep the temperature below 200° C., or below 180° C. to avoid, e.g., yellowing of the RSAP particles.

Without intending to be bound by theory, it is believed that increasing the purity of the RSAP may increase the overall quality of the RSAP. The purity of the RSAP may relate to an amount of residual material (e.g., fluff pulp, plastic, etc.) remaining in the RSAP, which may be controlled by the separation efficiency realized in the used absorbent article recycling process. Purity of the RSAP may be determined using the Method to Evaluate the Purity of RSAP, as described herein.

Overall, the RSAP may have a purity level of at least 85%, by weight of the RSAP, and in some examples, the purity level may be about 85% to about 100% or about 85% to about 99%, preferably about 87% to about 98%, most preferably about 90% to about 95%.

The RSAP may contain one or more residual drug entities, which were present, for example, in the body fluid(s) of the wearer (e.g., pharmaceutical compounds and hormones such as antibiotics, birth control hormones, painkillers, etc.). A level of the residual drug entities may be determined using the Method For Detection of Residual Drug Entities in RSAP, as described herein.

While not intending to be bound by theory, it is believed that the residual drug entities may have little impact on the RSAP quality. However, for some applications, it may be desirable for the RSAP to have substantially low levels (e.g., less than 1,000 micrograms per kilogram (μg/kg) of the one or more residual drug entities. Alternatively, it may be acceptable in other applications for the RSAP to have any level or higher levels of one or more residual drug entities.

The various particles in the RSAP may exhibit a median particle size of about 1 μm to about 1600 μm, as measured according to the Median Particle Size Test Method described herein. Preferably, the particles may exhibit a median particle size of about 30 μm to about 1000 μm, more preferably about 40 μm to about 900 μm, or most preferably about 200 μm to about 700 μm.

The particles may also exhibit a Centrifuge Retention Capacity (CRC) of about 10 g/g to about 50 g/g, as measured according to the Centrifuge Retention Capacity Test Method described herein. Preferably, the particles may exhibit a CRC of about 20 g/g to about 40 g/g. The CRC measures the liquid absorbed by the superabsorbent polymer particles for free swelling in excess liquid. Superabsorbent polymer particles having relatively high CRC value may be preferred because fewer superabsorbent polymer particles are needed to facilitate a required overall capacity for liquid absorption. However, without intending to be bound by theory, it is believed that the CRC may be limited by the surface cross-linking of the particles. While surface cross-linking may help to increase the permeability of the superabsorbent polymer particles, the stiffer surface limits the ability of the particle to swell and retain liquid. This tradeoff between permeability and capacity may be even more pronounced in smaller superabsorbent polymer particles.

Cementitious Compositions Comprising RSAP and Methods for Use Thereof

Figure 7:
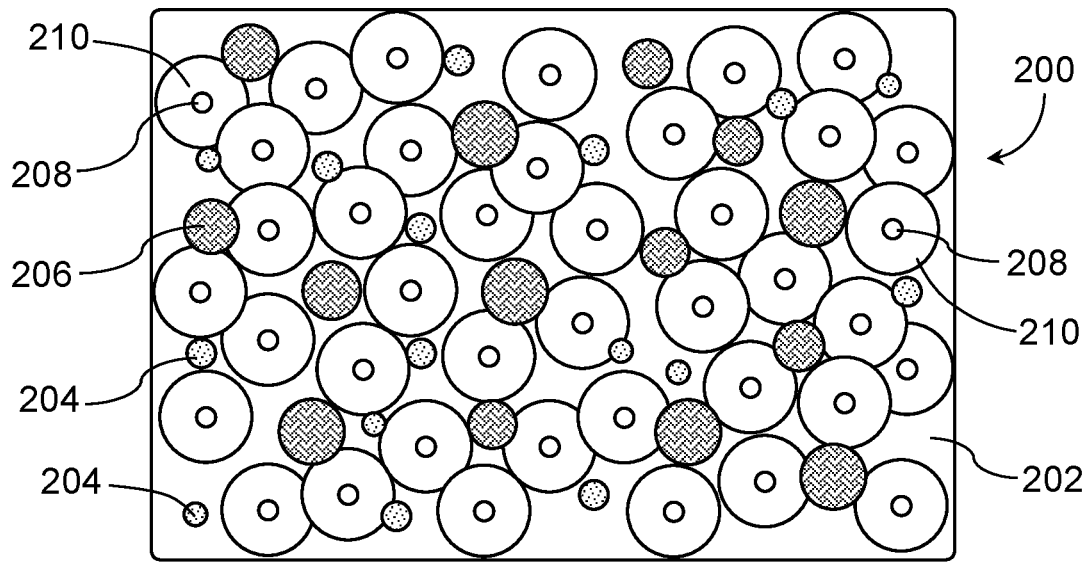
FIG. 7 is a schematic showing an exemplary cementitious composition.

As shown in FIG. 7, a cementitious composition 200 may be concrete, which is generally composed of a mixture of an aqueous fluid such as water; a cementitious material 202; fine aggregate 204 such as sand; and coarse aggregate 206 such as crushed rocks. Cementitious materials may include inorganic gelling materials. A common cementitious material used in the art is Portland cement. The combination of Portland cement (CaO, $SiO_2$, $Al_2O_3$, MgO, $SO_3$, $Fe_2O_3$) and water produces a hydration ("curing") reaction to produce calcium hydroxide and calcium-silicate-hydrate. Other types of cementitious materials may comprise, for example, fly ash, silica fume, ground limestone, ground furnace slag, clay, etc., all of which may be used alone or in combination with Portland cement.

In combining this mixture, the ratio of water to cementitious material may control, at least in part, several properties of the concrete, including strength. In general, the higher the ratio, the lower the compressive strength of the concrete. A minimum ratio of about 0.42 is generally needed to achieve full hydration. With reference to the graph shown in FIG. 8, conventional concrete may have a ratio of about 0.40 to about 0.60.

Figure 8:
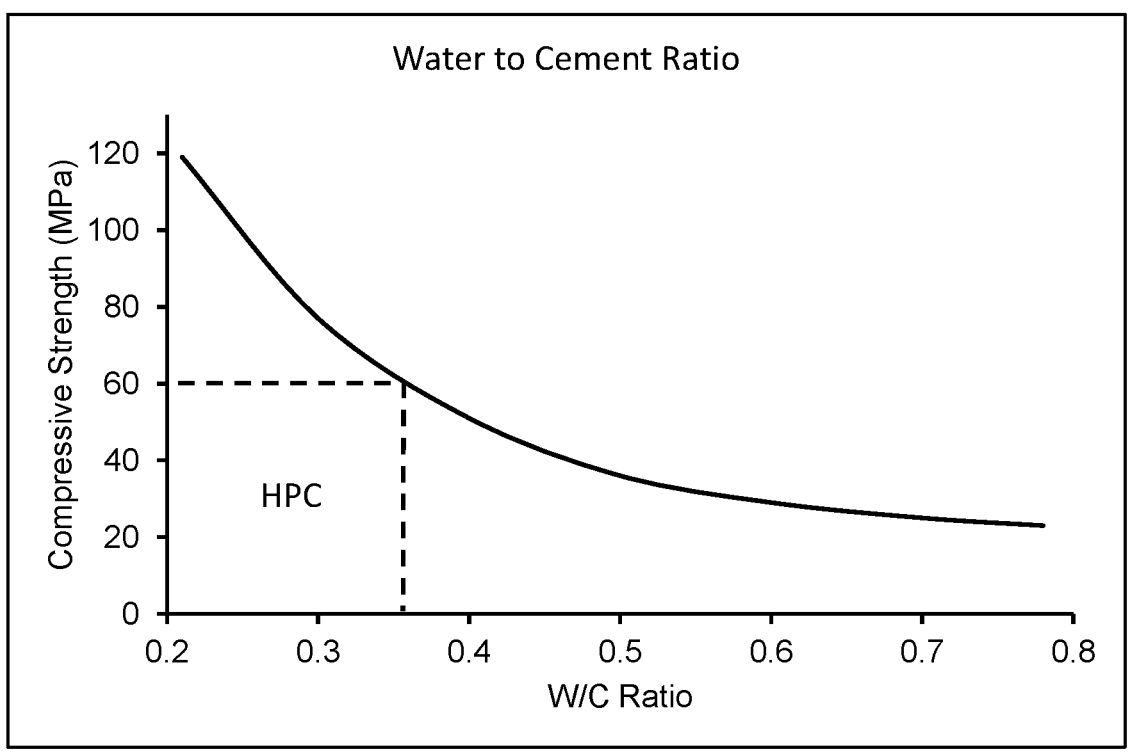
FIG. 8 is a graph depicting compressive strength (MPa) based on a ratio of water to cementitious material (W/C)

High-performance concrete (HPC), which is engineered to have increased mechanical properties over conventional concrete, typically contains 20-40% less water than conventional concrete. With reference to FIG. 8, the ratio of water to cementitious material for HPC may be about 0.25 to about 0.35, as shown in the region indicated by dashed lines. The lack of water in such a dense microstructure can cause self-desiccation, which may result in significant volumetric shrinkage and stress cracking. Despite its high compressive strength, concrete typically exhibits a low tensile strength. Thus, additional modification is often necessary to compensate for tensile loads, which may include external loads, imposed deformations, and expansive reactions.

External curing by adding extra water to the surface may help to combat self-desiccation. However, because of the high density of HPC, water may be unable to diffuse into the cement and reaches only the outer sections of the concrete. Furthermore, when the water inside the pore structure freezes and causes the volume of the water within the concrete to increase, the pore structures may expand. This expansion may produce stress in the concrete and may lead to worsening of existing cracks and/or creation of additional cracks. Other liquids and gases may enter the cracks, which may cause additional stress in the concrete and may lead to leakage of liquids and gases and/or damage, e.g., corrosion of other structures in or near the concrete.

One solution to self-desiccation is to add one or more internal curing agents 208, such as SAP, into the concrete composition, as shown in FIG. 7. SAPs are capable of dramatically increasing their volume to absorb and retain large quantities of water 210 that is released as the concrete cures, thus providing a continuous supply of water during curing. The addition of internal curing agents 208 may help to counteract self-desiccation and reduce autogenous shrinkage and cracking of the cement, which may improve the cement quality and properties, such as stability, strength, durability, setting time, and reduced leakage of water from the cement slurry.

In accordance with the present disclosure, a cementitious composition may comprise RSAP and a cementitious material. The RSAP may comprise any of the properties described herein and may be present in a range of about 0.025% to about 0.5% by weight of the cementitious material, preferably about 0.05% to about 0.4%, or most preferably about 0.07% to about 0.2%. In volumetric quantities, the RSAP may be present in about 3.5 ounces to about 40 ounces per cubic yard of the cementitious composition, preferably about 10 ounces to about 37 ounces per cubic yard, or most preferably from about 17 ounces to about 35 ounces per cubic yard.

As discussed above, the RSAP may comprise substantially low levels of one or more residual drug entities, and the RSAP may have a purity level of about 85% to about 100%, preferably about 87% to about 98%, most preferably about 90% to about 95%. A cementitious composition comprising RSAP may comprise a ratio of water to cementitious material of between about 0.2 to about 0.5 by weight, from about 0.25 to about 0.4, or from about 0.26 to about 0.35 by weight. Without intending to be bound by theory, it is believed that a cementitious composition comprising RSAP in accordance with the present disclosure may be able to achieve properties of HPC, e.g., a ratio of water to cementitious material of about 0.25 to about 0.35.

The disclosed cementitious composition may be included in a cement slurry used in underground operations, such as drilling operations, hydraulic fracturing operations, etc. The cement slurry may comprise RSAP, a cementitious material, and an aqueous fluid. The aqueous fluid may include, for example, freshwater, saltwater (natural or manmade), and any combination thereof.

Figure 9:
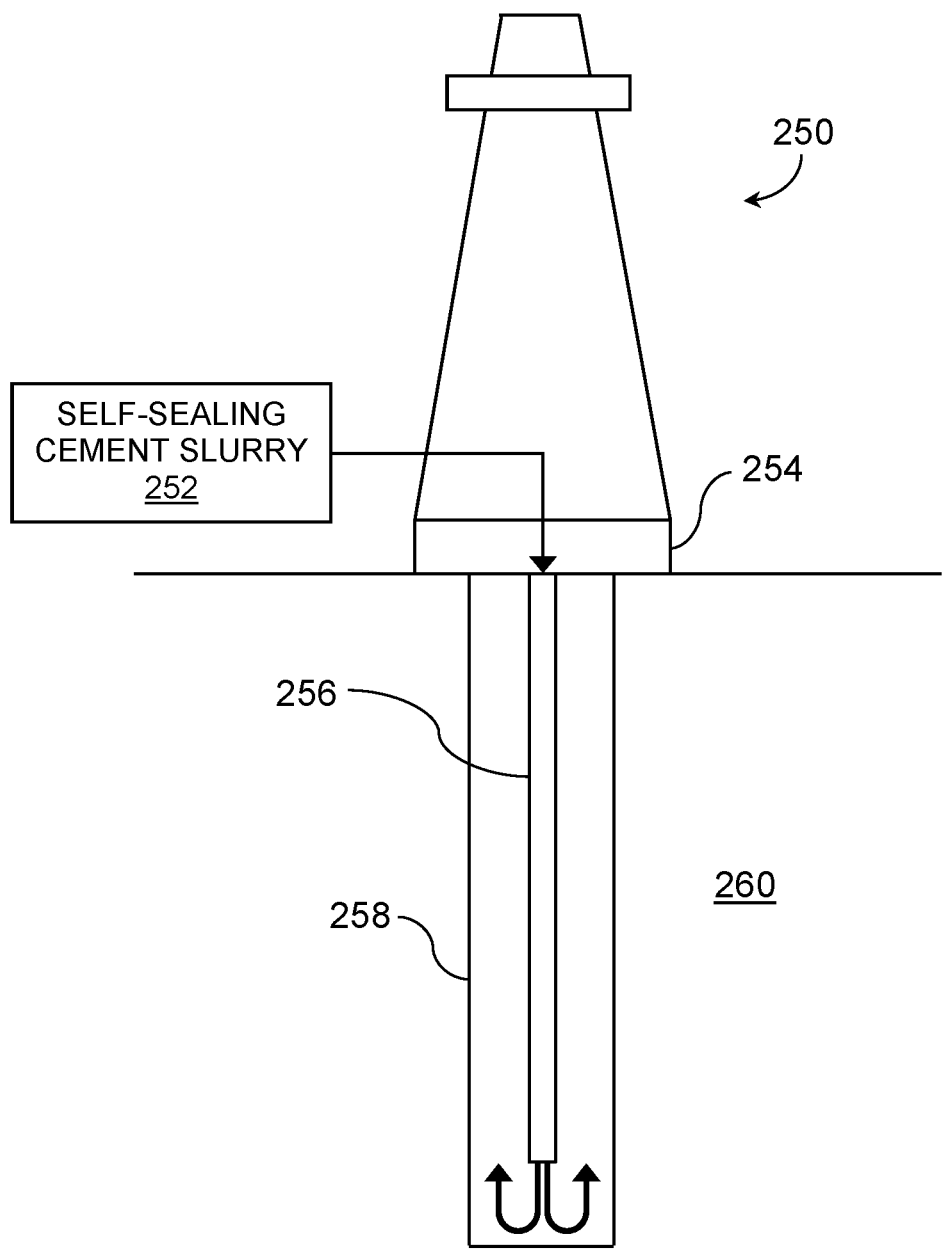
FIG. 9 is a schematic of an underground operation comprising a cement sheath.

Such underground operations often involve placing a cement sheath around a casing in, for example, a wellbore. FIG. 9 shows an illustrative schematic of an underground operation 250 in which a cement sheath is formed by, for example, pumping a cement slurry 252 to a wellhead 254 and into a well casing 256, where the cement slurry 252 enters a space between an outer wall of the well casing 256 and a wellbore 258 formed in the surrounding geological formation 260. The cement slurry 252 cures in the space and forms the cement sheath comprising a column of hardened concrete that helps to support the well casing 256 and bond the well casing 256 to the face of the surrounding geological formation 260. While operation 250 is depicted as taking place on land, one of ordinary skill in the art would recognize that such operations may also take place, for example, on the ocean floor.

Due to the presence of RSAP, it is believed that a cement slurry in accordance with the present disclosure may be able to swell, which may help to counteract self-desiccation and reduce shrinkage and cracking during curing of the cement slurry to form the cement sheath. Thus, the cement slurry may be capable of "self-sealing" and curing any imperfections created in the cement sheath as it sets. The cement slurry may swell in the presence of aqueous fluids (as described herein) and/or non-aqueous fluids. Such non-aqueous fluids may include, for example, one or more hydrocarbons, fuels, oils, and any combination thereof. These fluids may originate from the surrounding geological formation or may be introduced into the wellbore. In addition, it is believed that the presence of the RSAP may result in a cement sheath that is more resilient and flexible after curing, which may make the cement sheath more resistant to subsequent failure.

Figure 10:
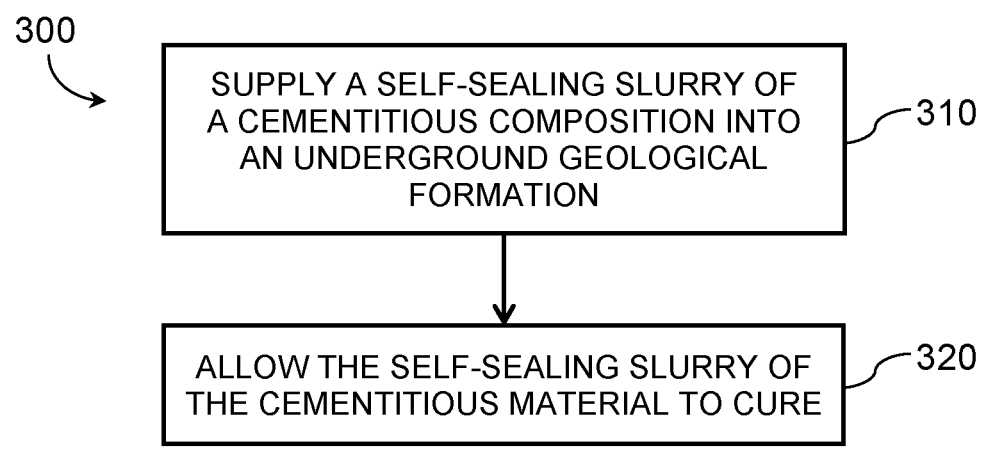
FIG. 10 is a flow diagram of a method for construction of a self-sealing cement sheath.

FIG. 10 is a flow diagram depicting a method 300 for the construction of a self-sealing cement sheath. The method 300 begins by supplying a self-sealing slurry of a cementitious composition into an underground geological formation, as indicated at step 310. The cementitious composition may comprise an aqueous fluid, a cementitious material, and RSAP as described herein. In some examples, the RSAP may have a purity level of between about 85% to 100%, about 85% and 99%, about 87% and about 98%, or about 90% and about 95%. In other examples, the RSAP may comprise one or more residual drug entities.

As indicated by step 320, the self-sealing cement slurry is then allowed to cure, thus forming a self-sealing cement sheath that may be capable of swelling in the presence of an aqueous fluid to seal any cracks formed in the self-sealing slurry during curing, after which the method 300 may conclude.

Test Methods

Unless otherwise specified, all tests described herein, including those described in the detailed description, are to be conducted on samples that are first conditioned in a conditioned room at a temperature of 73° F.±2° F. (23° C.±1° C.) and a relative humidity of 50% (±2%) for 2 hours prior to the test. All tests are to be conducted in such conditioned room(s).

Median Particle Size Test Method

This test method may be used to determine median particle size of RSAP. The median particle size test may be conducted to determine the median particle size of the RSAP using ASTM D502-89, "Standard Test Method for Particle Size of Soaps and Other Detergents", approved May 26, 1989, with a further specification for sieve sizes used in the analysis. Per Section 7, "Procedure using machine-sieving method," a nest of clean dry sieves containing U.S. Standard (ASTM E 11) sieves #8 (2360 µm), #12 (1700 µm), #16 (1180 µm), #20 (850 µm), #30 (600 µm), #40 (425 µm), #50 (300 µm), #70 (212 µm), #100 (150 µm) is required. A suitable sieve-shaking machine can be obtained from W.S. Tyler Company of Mentor, Ohio, U.S.A.

The data would be plotted on a semi-log plot with the micron size opening of each sieve plotted against the logarithmic abscissa and the cumulative mass percent plotted against the linear ordinate. The median particle size (D50), for the purpose of this disclosure, is defined as the abscissa value at the point where the cumulative mass percent is equal to 50 percent, and would be calculated by a straight line interpolation between the data points directly above (a50) and below (b50) the 50% value using the following equation:

$$D50=10^{\wedge}[\text{Log}(Da50)-(\text{Log}(Da50)-\text{Log}(Db50))*(Qa50-50\%)/(Qa50-Qb50)]$$

where Qa50 and Qb50 are the cumulative mass percentile values of the data immediately above and below the 50th percentile, respectively; and Da50 and Db50 are the micron sieve size values corresponding to these data.

In the event that the 50th percentile value falls below the finest sieve size (150 µm) or above the coarsest sieve size (2360 µm), then additional sieves would be added to the nest following a geometric progression of not greater than 1.5, until the median falls between two measured sieve sizes.

The Distribution Span of the particles is a measure of the breadth of the sample size distribution about the median. It would be calculated according to the following:

$$\text{Span}=(D84/D50+D50/D16)/2$$

Where D50 is the median particle size and D84 and D16 are the particle sizes at the sixteenth and eighty-fourth percentiles on the cumulative mass percent retained plot, respectively.

In the event that the D16 value falls below the finest sieve size (150 µm), then the span would be calculated according to the following:

$$\text{Span}=(D84/D50).$$

In the event that the D84 value falls above the coarsest sieve size (2360 µm), then the span would be calculated according to the following:

$$\text{Span}=(D50/D16).$$

In the event that the D16 value falls below the finest sieve size (150 µm) and the D84 value falls above the coarsest sieve size (2360 µm), then the distribution span would be taken to be a maximum value of 5.7.

Method to Evaluate the Purity Level of RSAP

This method may be used to determine the purity level of RSAP as described herein. There may be other validated methods used to determine the purity level of RSAP, as this method is provided as one possible option and there could be others utilized for this measurement.

A sample of RSAP would be weighed and its content would be determined using back-titration. Specifically, after weighing, a known excess of 0.3 M hydrochloric acid would be added to the specimen, followed by back titration to a pH of 7.0 with 0.1 M sodium hydroxide solution. Based on the molar quantity of hydrochloric acid delivered and the molar quantity of sodium hydroxide consumed, the molar quantity of neutralized repeated units on the RSAP may be calculated. For the purposes of this method, the RSAP may be by default presumed to be polyacrylic acid with a degree of neutralization on a molar basis of 70% (i.e., 30% of repeat units are in the acid form and 70% of repeat units are deprotonated, neutralized salt form). If greater accuracy in the degree of neutralization is required, a calibration curve can be generated. Starting with a separate sample of material, individual superabsorbent particles would be isolated manually with the aid of a microscope in order to generate a sample of 100% purity from which specimens to establish a calibration curve can be taken. Finally, from the initial mass of the sample, the calculated molar quantity of neutralized repeat units, and the degree of neutralization of the polymer material, the percent purity of the polymer superabsorbent polymer material sample may be determined. The purity level would be the average percentage value from 3 different samples of a given RSAP and would be reported as a percentage to the nearest integer percentage value.

Method for Detection of Residual Drug Entities in RSAP

Organic residual drug entities present in RSAP may be detected and quantified using trace-analysis techniques known to one of skill in the art. Accordingly, the following method is to be considered one non-exclusive, optional method that may be used.

A representative specimen of RSAP would be taken from the RSAP to be characterized. A solvent in which the organic residual drug entity of interest is soluble would be used to chemically extract the analyte from the specimen. The solvent would then be quantitatively analyzed for the drug entity of interest using a technique that is also chemically selective such as gas chromatography-mass spectrometry (GC-MS(/MS)) or liquid chromatography-mass spectrometry (LC-MS(/MS)). If MS-based techniques are used, a stable-isotope-labeled analyte is typically used as an internal standard. Based on the mass of the specimen of RSAP and the volume of solvent used to chemically extract the drug entity of interest, the concentration of the drug entity of interest determined to be present in the solvent via quantitative analysis would be used to calculate the quantity of drug entity of interest present on a mass per mass basis in the RSAP. If a drug entity of interest is detected, the result would be a positive detection of the drug entity of interest, and its level would be reported to at least two significant figures in units of micrograms per kilogram (μg/kg) of the sample section(s).

Method for Measuring Centrifuge Retention Capacity (CRC) of RSAP

Centrifuge Retention Capacity (CRC) may be measured according to EDANA method WSP 241.2-05.

What is claimed is:

1. A cementitious composition comprising:
   recycled superabsorbent polymer (RSAP), wherein the RSAP comprises residual material, the residual material comprising fluff pulp, plastic, or combinations thereof; and
   a cementitious material;
   wherein the RSAP has a purity level of 85% to 99%, wherein the purity level is measured according to the Method to Evaluate the Purity Level of RSAP.

2. The cementitious composition of claim 1, wherein the RSAP is present in a range of from about 0.025 percent to about 0.5 percent by weight of the cementitious material.

3. The cementitious composition of claim 2, wherein the cementitious composition comprises a ratio of water to the cementitious material of between about 0.2 to about 0.5 by weight of the cementitious composition.

4. The cementitious composition of claim 1, wherein the RSAP is present in a range of from about 0.13 kilograms per cubic meter (3.5 ounces per cubic yard) to about 1.48 kilograms per cubic meter (40 ounces per cubic yard) of the cementitious composition.

5. The cementitious composition of claim 1, wherein the RSAP comprises at least about 25 percent acrylic acid monomer units by weight of the RSAP.

6. The cementitious composition of claim 1, wherein the RSAP comprises between about 25 percent to about 100 percent acrylic acid monomer units by weight of the RSAP.

7. The cementitious composition of claim 1, wherein the RSAP comprises between about 25 percent to about 100 percent neutralized acrylic acid monomer units by weight of the RSAP.

8. The cementitious composition of claim 1, wherein the RSAP comprises one or more crosslinking monomers.

9. The cementitious composition of claim 1, wherein the RSAP comprises particles with surface crosslinking.

10. The cementitious composition of claim 1, wherein the RSAP comprises one or more residual drug entities.

11. The cementitious composition of claim 10, wherein the RSAP is recovered, extracted, or collected from soiled absorbent articles.

12. A cementitious composition comprising:
    recycled superabsorbent polymer (RSAP), wherein the RSAP comprises residual material, the residual material comprising fluff pulp, plastic, or combinations thereof; and
    a cementitious material;
    wherein the RSAP comprises one or more residual drug entities.

13. The cementitious composition of claim 12, wherein the RSAP is present in a range of between about 0.025 percent to about 0.5 percent by weight of the cementitious composition.

14. The cementitious composition of claim 12, wherein the RSAP is present in the range of between about 0.13 kilograms per cubic meter (3.5 ounces per cubic yard) to about 1.48 kilograms per cubic meter (40 ounces per cubic yard) of the cementitious composition.

15. The cementitious composition of claim 12, wherein the RSAP comprises between about 25 percent to about 100 percent acrylic acid monomer units by weight of the RSAP.

16. The cementitious composition of claim 15, wherein the RSAP comprises one or more crosslinking monomers.

17. The cementitious composition claim 12, wherein the RSAP is recovered, extracted, or collected from soiled absorbent articles.

18. A cementitious composition comprising:
    recycled superabsorbent polymer (RSAP), wherein the RSAP comprises residual material, the residual material comprising fluff pulp, plastic, or combinations thereof; and
    a cementitious material;
    wherein the RSAP comprises one or more residual drug entities, wherein the one or more residual drug entities have a concentration of less than 1,000 micrograms per kilogram of RSAP.

19. The cementitious composition of claim 18, wherein the RSAP comprises particles exhibiting a median particle size of about 30 μm to about 1000 μm, as measured according to the Median Particle Size Test Method as mentioned in the description and wherein the RSAP comprises particles exhibiting a Centrifuge Retention Capacity (CRC) of about 10 g/g to about 50 g/g, as measured according to the Centrifuge Retention Capacity Test Method, being measured according to EDANA method WSP 241.2-05.

20. The cementitious composition of claim 18, wherein the RSAP comprises particles with surface crosslinking, and wherein the RSAP is recovered, extracted, or collected from soiled absorbent articles.

* * * * *